US012070031B2

(12) United States Patent
Maxwell et al.

(10) Patent No.: US 12,070,031 B2
(45) Date of Patent: Aug. 27, 2024

(54) COMPOSITIONS AND METHODS FOR SYSTEMIC DELIVERY OF CARGOS IN VASCULAR PLANTS

(71) Applicant: UNIVERSITY OF CENTRAL FLORIDA RESEARCH FOUNDATION, INC., Orlando, FL (US)

(72) Inventors: Tyler Maxwell, Winter Haven, FL (US); Swadeshmukul Santra, Winter Park, FL (US); Parthiban Rajasekaran, Orlando, FL (US)

(73) Assignee: UNIVERSITY OF CENTRAL FLORIDA RESEARCH FOUNDATION, INC., Orlando, FL (US)

( * ) Notice: Subject to any disclaimer, the term of this patent is extended or adjusted under 35 U.S.C. 154(b) by 602 days.

(21) Appl. No.: 17/024,195

(22) Filed: Sep. 17, 2020

(65) Prior Publication Data
US 2022/0079147 A1   Mar. 17, 2022

(51) Int. Cl.
*A01N 25/26* (2006.01)
*A01N 43/16* (2006.01)

(52) U.S. Cl.
CPC ............. *A01N 25/26* (2013.01); *A01N 43/16* (2013.01)

(58) Field of Classification Search
CPC ........ A01N 25/26; A01N 43/16; A01N 25/28; A01N 47/44; A01P 1/00
See application file for complete search history.

(56) References Cited

U.S. PATENT DOCUMENTS

| | | |
|---|---|---|
| 2016/0060513 A1 | 3/2016 | Tharkur et al. |
| 2020/0237677 A1 | 7/2020 | Santra et al. |
| 2020/0407630 A1 | 12/2020 | Tharkur et al. |
| 2022/0290043 A1 | 9/2022 | Tharkur et al. |

OTHER PUBLICATIONS

Das et al, Effect of N-acetyl cysteine coated CdS:Mn/ZnS quantum dots on seed germination and seedling growth of snow pea (*Pisum sativum* L.): imaging and spectroscopic studies, 2015, Environ. Sci.: Nano, 2, 203-2012. (Year: 2015).*

Taylor et al, Evaluation of streptomycin seed treatments for the control of bacterial blight of peas (*Pseudomonas pisi Sackett* 1916), 1975, New Zealand Journal of Agricultural Research, 19:1, 91-95. (Year: 1975).*

Chichiriccò, Giuseppe et al., "Penetration and Toxicity of Nanomaterials in Higher Plants", Nanomaterials, 2015, vol. 5, pp. 851-873.

(Continued)

*Primary Examiner* — Trevor Love
(74) *Attorney, Agent, or Firm* — Timothy H. Van Dyke; Wolter, Van Dyke, Davis, PLLC

(57) ABSTRACT

Compositions and methods for systemic delivery of at least one cargo in a vascular plant. Compositions may include at least one cargo delivery particle, having a core and a shell; and at least one cargo disposed on the shell. The core may include at least one micronutrient. The shell may include a coating material. The at least one cargo delivery particle may have a size of less than about 10 nanometers. Methods may include administering an effective amount of the compositions to a plant.

7 Claims, 12 Drawing Sheets

(56) References Cited

OTHER PUBLICATIONS

Figure 1:
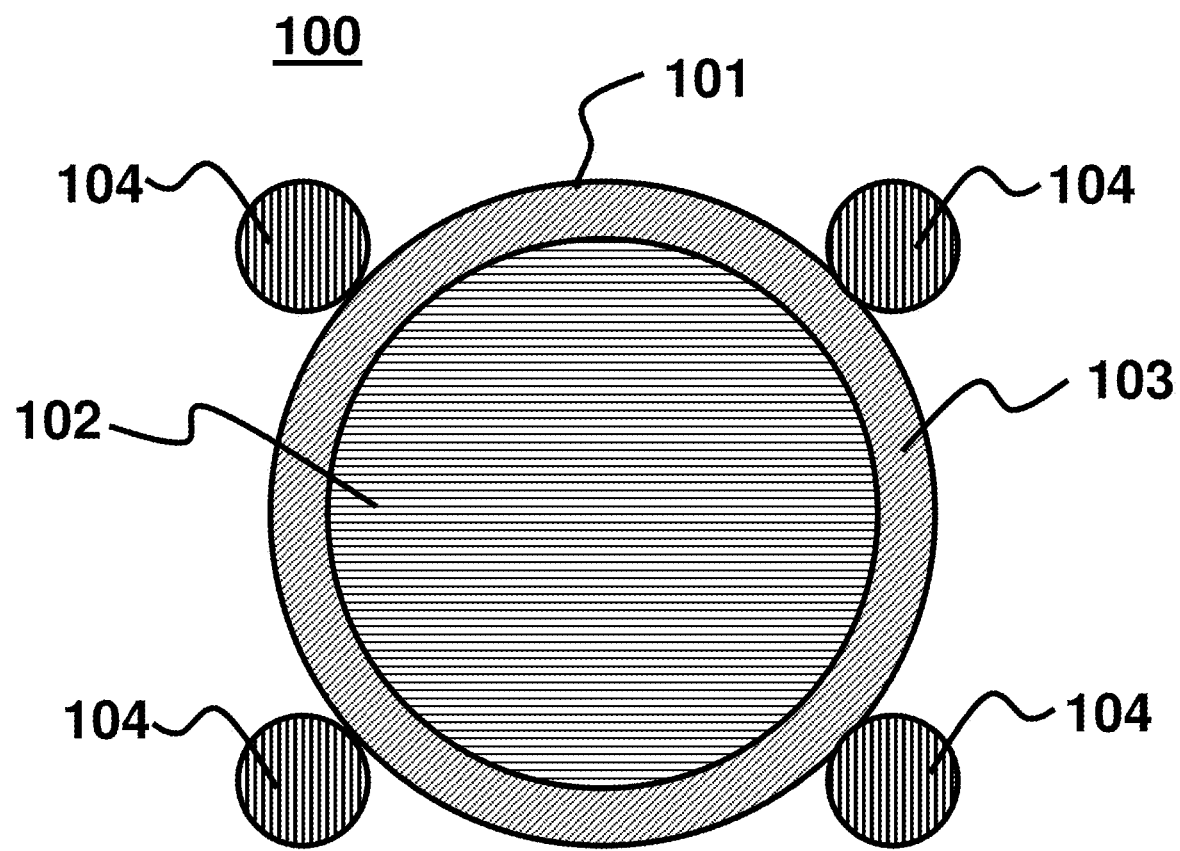

Crosson, Bruce et al., "Functional imaging and related techniques: An introduction for rehabilitation recearchers", JRRD, Nov. 2, 2010, vol. 47, 28 pages.

Dey, B., et al., "Green silver nanoparticles for drug transport, bioactivities and a bacterium (*Bacillus subtilis*)-mediated comparative nano-patterning feature", RSC Advances, 2016. 6(52): p. 46573-46581.

Duan, Junling et al., "Facile synthesis of Nacetylcysteine capped ZnS quantum dots as an eco-friendly fluorescence sensor for Hg2+", Talanta, 2011, vol. 85, pp. 1738-1743.

Etxeberria, Ed., et al., "Determining the Size Exclusion for Nanoparticles in Citrus Leaves", HortScience, 2016, vol. 51. No. 6, pp. 732-737.

Gavva, Sharvan., "Single Step Synthesis of Antibiotic Kanamycin Embedded Gold Nanoparticles for Efficient Antibacterial Activity", Masters Theses & Specialist Projects, 2013, paper 1282, 63 pages.

Graham, James H. et al., "Streptomycin Controls Citrus Canker on Sweet Orange in Brazil and Reduces Risk of Copper Burn on Grapefruit in Florida", Proc. Fla. State Hort. Soc., 2008, vol. 121, pp. 118-123.

Khan, Sarzamin et al., "Thioglycolic acidCdTe quantum dots sensing and molecularly imprinted polymer based solid phase extraction for the determination of kanamycin in milk, vaccine and stream water samples", Sensors and Actuators B, 2017, vol. 246, pp. 444-454.

Kumar, Govindarajan Venkat et al., "Preparation and characterization of kanamycin-chitosan nanoparticles to improve the efficacy of antibacterial activity against nosocomial pathogens", Journal of the Taiwan Institute of Chemical Engineers, 2016, vol. 65, pp. 574-583.

Lau, B. L. T. et al., "Precipitation and Growth of Zinc Sulfide Nanoparticles in the Presence of Thiol-Containing Natural Organic Ligands", Environmental Science & Technology, 2008, vol. 42, No. 19, pp. 7236-7241.

Maxwell, Tyler J., "Coated Quantum Dots: Engineering of Surface Chemistry for Biomedical and Agricultural Applications", Electronic Theses and Dissertations, 2019, 162 pages.

Maxwell, Tyler et al., "Heavy-metal free quantum dots—a robust delivery vehicle for antibiotics for enhanced antibacterial activity" American Chemical Society (ACS) National Meeting Mar. 30-Apr. 4, 2019, 1 page.

Maxwell, Tyler et al., "Heavy metal free quantum dots as a delivery vehicle for Antibiotics for Enhanced Antibacterial Activity", 2019, 1 page.

Maxwell, Tyler J. et al., "Non-phytotoxic zinc based nanoparticle adjuvant for improving rainfastness and sustained release of streptomycin", Environmental Nanotechnology, Monitoring & Mangement, 2020, vol. 14, 7 pages.
Maxwell, Tyler J. et al., "Heavy-metal free quantum dots—a robust delivery vehicle for antibiotics for enhanced antibacterial activity" Materials Innovation for Sustainable Agriculture (MISA) Symposium, University of Central Florida, Orlando, FL, Oct. 31-Nov. 1, 2018.
Mu, Haibo et al., "Gold nanoparticles make chitosan-streptomycin conjugates effective towards Gram-negative bacterial biofilm", RSC Adv., 2016, vol. 6, 8714-8721.
Nazerdeylami, Somayeh et al., "Synthesis and photoluminescent and nonlinear optical properties of manganese doped ZnS nanoparticles", Physica B, 2011, vol. 406, pp. 108-111.
Payne, Jason N. et al., "Novel Synthesis of Kanamycin Conjugated Gold Nanoparticles with Potent Antibacterial Activity", Frontiers in Microbiology, May 2016, vol. 7, article 607, 10 pages.
Sakthivadivel S. et al., "Synergistic Interactions of CdTe Quantum Dots with Antibiotic Against *S. aureus* Adhesion", adhesion International Conference on Advanced Nanomaterials & Emerging Engineering Technologies, Chennai, 2013, pp. 140-143.
Vacassay Robert et al., "Synthesis of Controlled Spherical Zinc Sulfide Particles by Precipitation from Homogeneous Solutions", J. Am. Ceram. Soc., 1998, vol. 81, No. 10, pp. 2699-2705.
Wang, Yan-Wen et al., "Enhanced bactericidal toxicity of silver nanoparticles by the antibiotic gentamicin", Environ. Sci.: Nano, 2016, vol. 3, pp. 788-798.
Maxwell, Tyler; Coated Quantum Dots: Engineering of Surface Chemistry for Biomedical and Agricultural Applications; Electronic Theses and Dissertations; https://stars.library.ucf.edu/etd; Aug. 2019; 2 pages.

* cited by examiner

300

```
┌─────────────────────────────────────────────────────────┐
│  DISPERSE A SALT OF A MICRONUTRIENT IN A SOLUTION       │～302
└─────────────────────────────────────────────────────────┘
                            │
                            ▼
┌─────────────────────────────────────────────────────────┐
│         ADD A COATING MATERIAL TO THE SOLUTION          │～304
└─────────────────────────────────────────────────────────┘
                            │
                            ▼
┌─────────────────────────────────────────────────────────┐
│  ALLOW COATING MATERIAL TO INTERACT WITH IONS OF        │～306
│                  THE MICRONUTRIENT                       │
└─────────────────────────────────────────────────────────┘
                            │
                            ▼
┌─────────────────────────────────────────────────────────┐
│              RAISE THE PH OF THE SOLUTION                │～308
└─────────────────────────────────────────────────────────┘
                            │
                            ▼
┌─────────────────────────────────────────────────────────┐
│   ALLOW FORMATION OF CARGO DELIVERY PARTICLES            │
│   HAVING A CORE COMPRISING THE MICRONUTRIENT             │～310
│   AND A SHELL COMPRISING THE COATING MATERIAL            │
└─────────────────────────────────────────────────────────┘
                            │
                            ▼
┌─────────────────────────────────────────────────────────┐
│          PURIFY THE CARGO DELIVERY PARTICLES             │～312
└─────────────────────────────────────────────────────────┘
                            │
                            ▼
┌─────────────────────────────────────────────────────────┐
│           DRY THE CARGO DELIVERY PARTICLES               │～314
└─────────────────────────────────────────────────────────┘
```

FIG. 3A

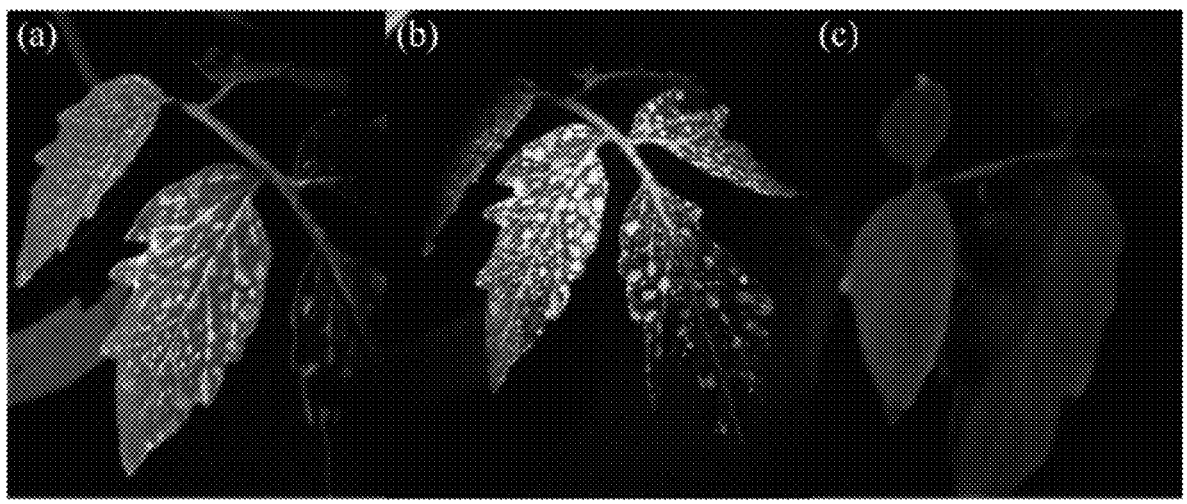
FIG. 12A  FIG. 12B  FIG. 12C

COMPOSITIONS AND METHODS FOR SYSTEMIC DELIVERY OF CARGOS IN VASCULAR PLANTS

STATEMENT REGARDING FEDERALLY SPONSORED RESEARCH OR DEVELOPMENT

This invention was made with government support under USDA-NIFA CDRE grant #2015-70016-23010. The government has certain rights in this invention.

BACKGROUND

Bacterial pathogens have devastated the Florida citrus production in recent years. Citrus canker, is a harmful foliar disease affecting most citrus varieties, caused by the bacterium *Xanthomonas citri* subsp. *citri*. This disease results in the loss of fruit production through unsightly blemishes, premature fruit drop, and defoliation of the tree. The canker-causing bacteria are spread by windblown rain which can deposit the pathogens directly in the plant stomata. Film-forming copper based bactericides such as copper hydroxide and copper oxychloride are extensively used to control the spread of the disease. These Cu compounds form a lasting protective copper film on the leaf surface due to their lower solubility product. However, frequent applications (up to 15 sprays per season) of these Cu compounds is needed for disease control. Aggressive use of copper contributes to soil Cu and increases the risks of toxic Cu leaching through water runoff. This could damage the aquatic ecosystems, potentially harming many aquatic lives. Although Cu is still a standard bactericide/fungicide, frequent applications increase the risks of development of Cu-tolerant bacteria and can be also harmful to the soil microbiome.

Recently, antibiotics streptomycin and oxytetracycline, originally developed for human use, have been labeled for controlling citrus disease in Florida including Huanglongbing (HLB, also known as citrus greening). These antibiotics are used to control bacterial diseases in pom fruit, such as fire blight in apple and pear. Although they are effective for contact killing of bacteria, unlike Cu, antibiotics do not offer long-term protection, which is particularly important for controlling citrus canker disease. The ability of a material to resist wash-off, also known as rainfastness, is poor for highly water-soluble antibiotics such as streptomycin sulfate. A lasting antimicrobial residue on the leaf surface is critical to defend the plant against bacterial invasion through windblown rain. This is especially important for citrus production areas in Florida and Costa Rica that experience frequent rainfall. Thus, the development of suitable adjuvant to improve the rainfastness of antibiotics such as streptomycin sulfate, is important to improve performance and minimize negative impacts on non-target organisms.

BRIEF SUMMARY

This section will be completed once the claims are finalized.

These and other features, aspects, and advantages of various embodiments will become better understood with reference to the following description, Figures, and claims.

BRIEF DESCRIPTION OF THE FIGURES

Many aspects of this disclosure can be better understood with reference to the following Figures.

FIG. 1 shows an example according to various embodiments illustrating a cargo delivery system for plants.

FIG. 2 shows an example according to various embodiments illustrating a method of administering a composition to a vascular plant.

FIG. 3A shows an example according to various embodiments illustrating a method for producing cargo delivery particles according to various embodiments.

FIG. 3B shows an example according to various embodiments illustrating a method for producing compositions according to various embodiments.

FIG. 4 shows an example according to various embodiments illustrating a schematic diagram of a NAC-ZnNP-streptomycin conjugate (ZnNP-Strep).

FIG. 5A-B show examples according to various embodiments illustrating HRTEM images of NAC-ZnNP at different magnifications.

FIG. 6A shows an example according to various embodiments illustrating the hydrodynamic diameter of Nac-ZnNP and ZnNP-Strep.

FIG. 6B shows an example according to various embodiments illustrating the Zeta potential of NAC-ZnNP and ZnNP-Strep at pH 8.

FIG. 6C shows an example according to various embodiments illustrating the fluorescence emission of NAC-ZnNP and ZnNP-Strep at 320 nm excitation.

FIG. 6D shows an example according to various embodiments illustrating FTIR spectra of NAC-ZnNP, streptomycin sulfate, and ZnNP-Strep.

FIG. 7 shows an example according to various embodiments illustrating the amount of streptomycin (ppm) released with respect to time.

FIG. 8 shows an example according to various embodiments illustrating rainfastness of streptomycin sulfate (Strep), FIREWALL™ 50 WP, and ZnNP-Strep on citrus leaves.

FIG. 9 shows an example according to various embodiments illustrating a Streptomycin LCMS calibration curve used to determine the release rate, loading, and rainfastness of ZnNP-Strep.

FIG. 10 shows an example according to various embodiments illustrating a Zinc AAS calibration curve used to determine the concentration of NP in solution.

FIG. 11 shows an example according to various embodiments illustrating images of tomato leaves 72 hours after treatment in phytotoxicity experiments.

FIG. 12A shows an example according to various embodiments illustrating an image of tomato leaves 72 hours after treatment with ZnNP-Strep (500 ppm) in phytotoxicity experiments illuminated with a handheld UV light at 367 nm.

FIG. 12B shows an example according to various embodiments illustrating an image of tomato leaves 72 hours after treatment with ZnNP-Strep (500 ppm) in phytotoxicity experiments illuminated with a handheld UV light at 254 nm.

FIG. 12C shows an example according to various embodiments illustrating water treated tomato leaf illuminated with a handheld UV lamp at 254 nm.

The various embodiments are not limited to the examples illustrated in the Figures.

DETAILED DESCRIPTION

Introduction and Definitions

Various embodiments may be understood more readily by reference to the following detailed description. Unless defined otherwise, all technical and scientific terms used herein have the same meaning as commonly understood by one of ordinary skill in the art to which this disclosure belongs.

The term "mol percent" or "mole percent" generally refers to the percentage that the moles of a particular component are of the total moles that are in a mixture. The sum of the mole fractions for each component in a solution is equal to 1.

It is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant Figure.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by prior disclosure. Further, the dates of publication provided could be different from the actual publication dates that may need to be independently confirmed.

Unless otherwise indicated, the present disclosure is not limited to particular materials, reagents, reaction materials, manufacturing processes, or the like, as such can vary. It is also to be understood that the terminology used herein is for purposes of describing particular embodiments only and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

As used herein the term "therapeutic benefit" is used to refer to suppression of one or more plant pathogens. A therapeutic benefit may be preventative or curative. For example, a therapeutic benefit may suppress a plant pathogen by strengthening a plant's resistance to the pathogen and/or by reducing the extent of a pre-existing infection of the plant pathogen.

As used herein the term "suppress or suppression" is used to mean changing the amount or rate of spread of a plant pathogen infection or reducing the extent of a plant pathogen infection.

As used herein the term "plant pathogen" relates to an organism (e.g. insect, bacteria, fungus, or virus) that infects a plant resulting in an adverse consequence in the plant and/or causes a plant disease.

As used herein, the term "rainfastness" refers to the degree to which a surface treatment resists being washed off of a surface by rain.

The following abbreviations are used throughout: NP, nanoparticle; NAC, N-acetylcysteine; ZnS:Mn, manganese doped zinc sulfide; ZnNP-NAC, ZnS:Mn coated with NAC; ZnNP-Strep, ZnNP-NAC conjugated with streptomycin; MIC, minimum inhibitory concentration; MBC, minimum bactericidal concentration; CFU, colony forming unit; DLS, dynamic light scattering; HRTEM, high resolution transmission electron microscopy. All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

The examples and embodiments described herein are for illustrative purposes only and that various modifications or changes in light thereof will be suggested to persons skilled in the art and are to be included within the spirit and purview of this application. Many variations and modifications may be made to the above-described embodiment(s) of the disclosure without departing substantially from the spirit and principles of the disclosure. All such modifications and variations are intended to be included herein within the scope of this disclosure.

Composition Comprising Cargo Delivery Particle(s) and Cargo(s)

FIG. 1 is an example according to various embodiments illustrating a composition 100 for plants. The composition 100 may include one or more cargo delivery particles 101 having a core 102 and a shell 103. The composition 100 may also include a cargo 104 or a plurality of cargos 104. It is noted that FIG. 1 is schematic and depicts substantially round cross-sectional structures for convenience of illustration and labeling; a person having ordinary skill in the art will readily appreciate that any three-dimensional shape or combination of three-dimensional shapes may be employed according to various embodiments. Elements of the composition 100 will be described in greater detail hereinafter.

Cargo Delivery Particle(s)

The cargo delivery particle 101 may deliver the one or more cargos 104 to previously unreachable or difficult to access areas of a plant, including but not limited to via components of a plant's vasculature. Embodiments delivering cargos via a plant's vasculature may provide systemic delivery of the cargos 104. Such systemic delivery may provide a systemic effect, meaning that even if locally administered, one or more cargo delivery particles 101 and cargos 104 may ultimately be found in multiple tissues of the plant to which the composition 100 is administered. For example, according to various embodiments, despite being administered at a single location or at a limited number of locations of the plant, cargo delivery particles 100 and/or cargos 104 may ultimately be found in many tissues of the plant or even in every tissue of the plant. The cargos 104 may provide one or more therapeutic benefits to the plant. Additionally, according to various embodiments, the core 102 and/or the shell 103 may provide one or more therapeutic and/or nutritional benefits to the plant.

The compositions described herein provide significant advantages compared to administering the cargo alone. When administered alone, some cargoes may be bound to a plant enzyme and subsequently absorbed. When associated with a cargo delivery particle 101, according to various embodiments, however, the cargo is not 100% available immediately upon injection. The composition 100 may, therefore, provide improved systemic effect via a slow-release mechanism, whereby the cargo only becomes available for absorption after it is transported through the plant's vasculature. According to some embodiments, the dissolution rate of composition 100 may vary based on the plant type, on the in planta environment, as well as on various environmental conditions. Performance of compositions, may, therefore, vary based on geographical locations and plant type.

Prior to various embodiments described herein, efficient delivery of cargos to a plant's vasculature system, in particular to phloem tissue, was challenging. According to various embodiments, the cargo delivery particles 101 may be "protein-sized" as defined hereinafter. The cargo delivery particles 101 may, therefore, have a unique in planta mobility, enabling them to freely move to phloem tissue by passing through cambiums. Each of the cargos 104 may also be "protein-sized" as defined hereinafter. According to various embodiments, a "protein-sized" particle may have a size of less than about 10 nm or from about 2 nm to about 6 nm, or of less than about 5.4 nm. Each range described herein is intended to include all numerical values encompassed by the range. Furthermore, additional ranges may be formed from any lower limits and/or upper limits described herein. For example, a "protein-sized" particle may have a size within a range having a lower limit and/or an upper limit. The range may include or exclude the lower limit and/or the upper limit. By way of example and not limitation, a lower limit and/or an upper limit may be selected from 0.5, 1, 1.5, 2, 2.5, 3, 3.5, 4, 4.5, 5, 5.1, 5.2, 5.3, 5.4 5.5, 5.6, 5.7, 5.8, 5.9, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5 and 20 nm. A range formed from a single lower limit includes at least the lower limit and all numerical values greater than the lower limit regardless of whether the values are explicitly recited in this disclosure. A range formed from a single upper limit includes at least the upper limit and all numerical values less than the upper limit regardless of whether the values are explicitly recited in this disclosure. A range formed from a combination of a lower limit and an upper limit includes at least the lower limit, the upper limit, and all numerical values there between regardless of whether the values are explicitly recited in this disclosure. For example, based on the set of exemplary upper limits and lower limits explicitly recited above, a protein-sized particle may have a size of: about 0.5 to about 20 nm, less than about 0.5 nm, greater than about 0.5 nm, less than about 20 nm, or greater than about 20 nm, etc. All such ranges are contemplated and are intended to be explicitly disclosed and recited. Each value recited is intended to be modified by the term "about."

Core of the Cargo Delivery Particle(s)

Still referring to FIG. 1, the core 102 may include one or more micronutrients. The micronutrients may be, for example, metal micronutrients. Examples of metal micronutrients include, but are not limited to iron (Fe), copper (Cu), zinc (Zn), manganese (Mn), molybdenum (Mo), nickel (Ni), and various combinations thereof. Any combination of micronutrients may be employed. According to various embodiments, the metal micronutrient may be present in the core 102 in the form of a metal oxide, such as, for example, zinc oxide (ZnO), Zn hydroxide, Copper oxide, Copper hydroxide, Magnesium oxide, Magnesium hydroxide. The metal oxide may be present in any form. For example, zinc oxide may be present in any form, including hexagonal wurtzite and/or cubic zincblende.

The core 102 may further include one or more inorganic compounds. Any or all of the one or more inorganic compounds may have one or more of a variety of properties, including but not limited to antibacterial efficacy and fluorescence. For example, the one or more inorganic compounds may include fluorescent material. The one or more inorganic compounds may additionally or alternatively include an antibacterial material. One example of an inorganic compound that may be present in the core is Zinc sulfide (ZnS).

The materials that comprise the core 102 may be in the form of one or more nanostructures. As used herein, the term "nanostructures" refers to materials having at least one dimension between about 1 to about 100 nm. A variety of nanostructures may be employed, including, for example, nanowires, nanorods, tetrapods, nanobelts, nanoflowers, and nanoparticles. A person having ordinary skill in the art will readily appreciate the morphologies of various nanostructures as well as how to produce them. As a specific example, the core 102 may include a nanoparticle comprising at least one metal micronutrient and ZnS, or in a variety of morphologies including, but not limited to those listed above.

The "protein-sized" cargo delivery particles 101 having cores 102 comprising metal micronutrients, such as ZnO or ZnS, may eventually degrade to metal ions, such as Zn ions, and become a part of the plant's micronutrient pool, contributing to productivity improvement. The cargo delivery particles 101, according to various embodiments, may be more soluble than fertilizer-grade bulk metal oxides, such as ZnO due to increased surface area. The U.S. Food and Drug Administration (US FDA) listed ZnO as being generally recognized as safe (GRAS) if it is used as food additive. The U.S. Environmental Protection Agency (US EPA) has recently exempted ZnO (CAS Reg. No. 1314-13-2) from the requirement of tolerance when is used as an additive in an amount of up to 15% (wt/wt) in bactericide/fungicide formulations. A beneficial effect of ZnO (having a size of about 10 nm) on cucumber fruit (*Cucumis sativus*) was reported in greenhouse settings. As reported, soil application of ZnO at rates of 400 and 800 mg/kg did not demonstrate any negative effect on carbohydrate and antioxidant contents, but increased starch and protein content in comparison to untreated controls. According to various embodiments, ZnO may also provide various antimicrobial properties. For example, ZnO may provide effective antibacterial activity against gram-negative bacteria *Escherichia coli, Xanthomonas alfalfa, Pseudomonas aeruginosa*, and gram-positive bacteria *Staphylococcus aureus*. Detailed mechanisms of antimicrobial activity of ZnO have not been fully understood yet. Suggested mechanisms of killing are linked to release of antimicrobial zinc ions and production of reactive oxygen species.

The core 102 may additionally or alternatively comprise carbon-based nanomaterials such as carbon nanotubes, or nano-onions, which may further contribute to productivity increases, presumably due to their activity as plant stimulant.

According to various embodiments, the core may contain the metal micronutrient in an amount of from about 1 to about 5% by weight. Each range described herein is intended to include all numerical values encompassed by the range. Furthermore, additional ranges may be formed from any lower limits and/or upper limits described herein. For example, according to various embodiments, the core may contain the metal micronutrient in an amount within a range having a lower limit and/or an upper limit. The range may include or exclude the lower limit and/or the upper limit. By way of example and not limitation, a lower limit and/or an upper limit may be selected from 0.5, 1, 1.5, 2, 2.5, 3, 3.5, 4, 4.5, 5, 5.5, 6, 6.5, 7, 7.5, 8, 8.5, 9, 9.5 and 10% by weight. A range formed from a single lower limit includes at least the lower limit and all numerical values greater than the lower limit regardless of whether the values are explicitly recited in this disclosure. A range formed from a single upper limit includes at least the upper limit and all numerical values less than the upper limit regardless of whether the values are explicitly recited in this disclosure. A range formed from a combination of a lower limit and an upper limit includes at least the lower limit, the upper limit, and all numerical values therebetween regardless of whether the values are explicitly recited in this disclosure. For example, based on the set of exemplary upper limits and lower limits explicitly recited above, according to various embodiments, core may contain the metal micronutrient in an amount of: about 0.5 to about 10% by weight, less than about 0.5% by weight, greater than about 0.5% by weight, less than about 10% by weight, or greater than about 10% by weight, etc. All such ranges are contemplated and are intended to be explicitly disclosed and recited. Each value recited is intended to be modified by the term "about." As an example, according to various embodiments, the core may comprise Zn in an amount of from about 1 to about 5% by weight, or in an amount of about 2.5% by weight (25,000 ppm). Various embodiments include amounts of a metal micronutrient in the core that are non-phytotoxic for the particular plant. For example, up to 1000 ppm of metallic Zn has been tested against ornamental *vinca* and found to be non-phytotoxic.

An advantage of various embodiments is that the core 102 may eventually degrade to metal ions, which may then be metabolized by the plant, leaving behind no nano-residue in the plant.

Shell of the Cargo Delivery Particle(s)

Still referring to FIG. 1, the shell 103 may be disposed on or around the core 102. The shell 103 may cover or coat all or a portion of an exterior surface of the core 102. One or more cargos 104 may be disposed on the shell 103.

According to various embodiments, the shell may be made of a coating material that may interact with the cargo. According to various embodiments, the interaction between the coating material and the cargo(s) may include a covalent bond, a non-covalent interaction, an intermolecular interaction, or any combination thereof. As used herein, a covalent bond refers to a chemical bond that involves the sharing of electron pairs between atoms. Covalent bonding includes many kinds of interactions, including at least σ-bonding, π-bonding, metal-to-metal bonding, agostic interactions, bent bonds, and three-center two-electron bonds. As used herein, a non-covalent interaction differs from a covalent bond in that it does not involve the sharing of electrons, but rather involves more dispersed variations of electromagnetic interactions between molecules or within a molecule. Non-covalent interactions include at least electrostatic interactions, Van der Waals forces, 7-effects, hydrophobic effects. Electrostatic interactions may include at least ionic interactions, hydrogen bonding, and halogen bonding. Van der Waals forces may include at least dipole-dipole interactions, dipole-induced dipole interactions, and London dispersion forces. 7-effects may include at least π-π interactions, cation-π interactions, anion-π interactions, and polar-π interactions. As used herein, intermolecular interactions or forces are the forces which mediate interaction between molecules, including forces of attraction or repulsion which act between molecules and other types of neighboring particles, e.g. atoms or ions. Intermolecular interactions include at least ion-dipole interactions, dipole-dipole interactions, dipole-induced dipole interactions, and induced dipole-induced dipole interactions. Any of these types of interactions or any combination of these types of interactions may provide a mechanism by which the coating material may interact with the cargo(s) disposed thereon or associated therewith.

The coating material may be any material suitable for coating the core and providing a desirable interaction with a particular cargo to be delivered. According to various embodiments, the coating material may comprise N-acetylcysteine (NAC), salicylate, caffeine, or any combination thereof. For example, various embodiments provide a composition and a method of making "protein-sized" zinc sulfide (ZnS) nanoparticles coated with N-acetylcysteine (NAC). Zinc sulfide nanoparticles coated with N-acetylcysteine (NAC-ZnS) is an example of a systemic cargo delivery system according to various embodiments. A wide range of cargos can be systemically delivered using NAC-ZnS, as long as NAC interacts with the cargos of interest. For various applications, the coating material, such as a NAC coating, may be useful to improve dispersibility (solubility) of the core nanoparticles, such as ZnS, in an aqueous medium, as well as, to prevent agglomeration of the nanoparticles. Various tested embodiments demonstrate that NAC-ZnS is capable of systemic delivery of a cargo comprising an antimicrobial composition to a vascular plant.

An have the advantage that NAC and Zn are generally recognized as safe (GRAS), requiring minimal regulatory requirements. Both Zn and NAC should be considered favorably by Organic Materials Review Institute (OMRI) for organic farming. In fact, both NAC and Zn are nutritional supplements for humans. According to various embodiments the ratio of Zn to NAC may be in a range of from about 1:1 to about 1:0.25. Less NAC results in smaller particles. More NAC allows more S to S binding causing agglomeration, which may be a problem when the composition is systemically administered to a vascular plant, but may be useful in spraying application, because the agglomeration allows for film formation on various surfaces of the plant.

Some Exemplary Cargo(s)

Various embodiments provide systemic delivery of a wide variety of cargos. For convenience and clarity, some examples of various cargos are grouped into categories hereinafter, but it should be understood than any cargo or combination of cargos may be employed. Cargos may include therapeutic molecules for controlling plant disease or any type of plant deficiencies, such as antimicrobial compounds. Cargos may include agrichemical active ingredients, such as insecticides, bactericides, fungicides, or combinations thereof.

For example, according to various embodiments, a cargo may comprise mancozeb. Mancozeb is registered as a general use pesticide by the U.S. Environmental Protection Agency. Mancozeb is a dithiocarbamate non-systemic agricultural fungicide with multi-site, protective action on contact. More specifically, mancozeb is a combination of two other dithiocarbamates: maneb and zineb. The mixture controls many fungal diseases in a wide range of field crops, fruits, nuts, vegetables, and ornamentals.

Cargos may include metal micronutrients, as described above with respect to possible components of the core. Examples of metal micronutrients include, but are not limited to iron (Fe), copper (Cu), zinc (Zn), manganese (Mn), molybdenum (Mo), nickel (Ni), and various combinations thereof. Cargos may include biomolecules, such as proteins, peptides, nucleic acids, Systemic Acquired Resistance (SAR) chemicals, antioxidants, or combinations thereof. For example, according to various embodiments, a cargo may comprise double-stranded RNA.

Other exemplary cargos may include one or more agricultural antibiotics. According to various embodiments, the agricultural antibiotic may be positively charged to facilitate adhesion to the shell. The positively-charged agricultural antibiotic may be, for example, streptomycin. Compositions according to various embodiments may, therefore, be antimicrobial treatment compositions for suppressing or preventing a plant pathogenic bacteria. According to various embodiments, the plant pathogenic bacteria may include *X. alfalfae* and/or *P. syringae*.

Antibiotic streptomycin has been extensively used for the treatment of bacterial infection in human. Streptomycin is also used in agriculture to protect pome fruits from fire blight, a destructive bacterial disease. Recently, streptomycin sulfate (65.8% A.I.) has been labeled for suppression of Huanglongbing in Florida, USA. The A.I. is water soluble and therefore suffers from poor rainfastness after foliar application. Due to high polarity, uptake and mobility of streptomycin sulfate through phloem vascular system is limited. Furthermore, streptomycin is prone to UV degradation when exposed to direct sunlight. Various embodiments provide an efficient adjuvant to improve rainfastness, UV-stability and vascular mobility. Various embodiments provide a non-phytotoxic zinc sulfide (ZnS) nanoparticle based adjuvant, demonstrating improved rainfastness and sustained release of streptomycin. Antibacterial efficacy of streptomycin and the ZnS-streptomycin conjugate was found comparable when tested against model plant pathogenic bacteria (*E. coli*, *X. alfalfae*, and *P. syringae*).

According to various embodiments, rainfastness of streptomycin foliar treatments may be improved by utilizing a nanoparticle (NP) as the sticker. NPs, due to their small size, possess a high surface-to-volume ratio which can help them stick to surfaces such as plant foliage. According to various embodiments, the rainfastness property of antibiotics may be improved if the antibiotics are coated with the NP sticker. Protein size fluorescent (<10 nm) manganese doped zinc sulfide NPs (ZnNPs) may be used as an antibiotic sticker (as well as carrier) due to their ultra-small size, low toxicity profile and plant micronutrient (Mn, S, Zn) based composition. The ZnNPs may be synthesized via a scalable and environmentally-friendly precipitation reaction. Dopant Mn ions within the semiconductor zinc sulfide (ZnS) crystal lattice serves as the fluorescent center that exhibits characteristic 590 nm emission. Unlike other fluorescent semiconductor NPs, these are free of toxic heavy-metals (such as cadmium and lead). Potential use of these NPs as biomedical imaging agent has been evaluated due to their ultra-small size, fluorescent property and low toxicity. However, applicability of micronutrient-rich ZnNPs in plant system has not been extensively evaluated. Sustained release of essential micronutrient $Zn^{2+}$ ions may be achieved, according to various embodiments, as the ZnNP goes through a degradation process, improving plant growth as a nutritional supplement. Various embodiments relate to N-acetylcysteine (NAC) coated ZnNPs as an antibiotic sticker.

Methods of Administration

Figure 2:
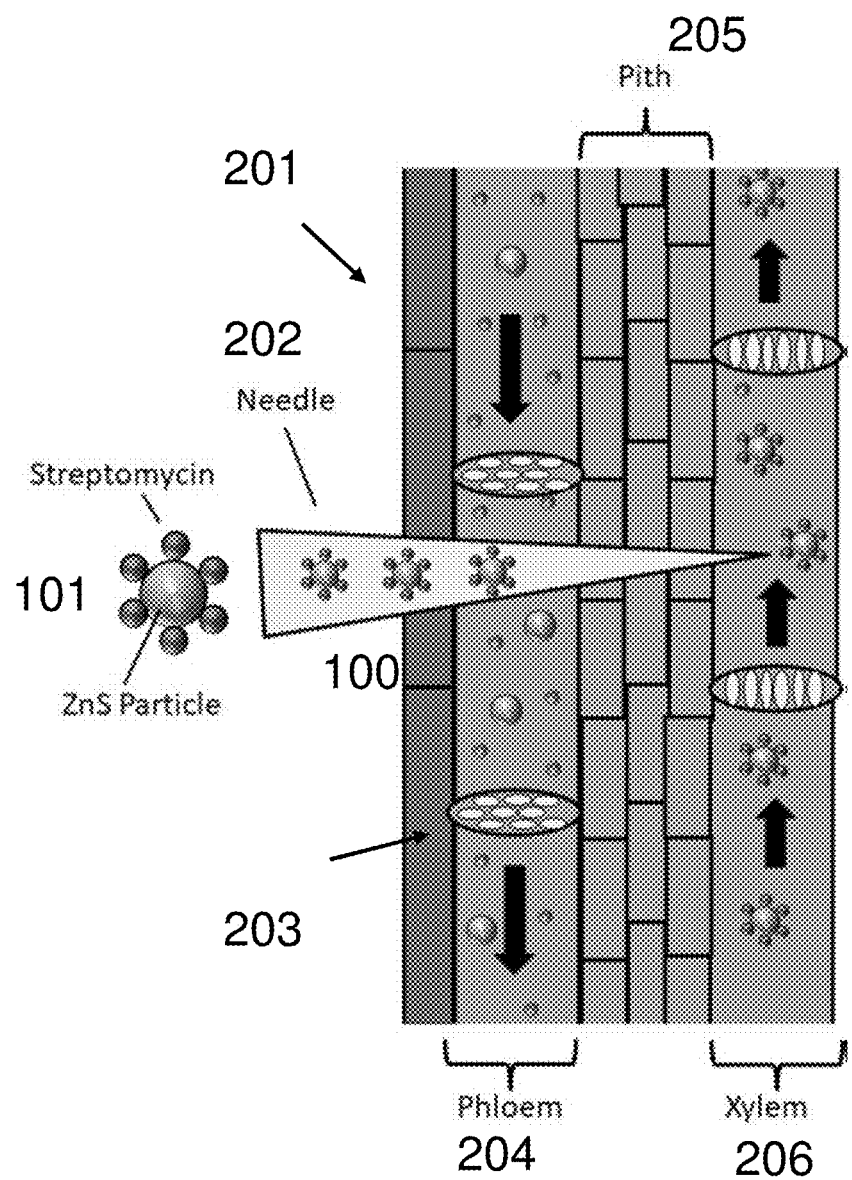

FIG. 2 shows an example according to various embodiments illustrating a method 200 of administering a composition to a vascular plant 201. A composition 100 comprising at least one cargo delivery particle 101 and at least one cargo (not specifically shown) associated therewith may be injected into the vascular plant 201 via a needle 202. The needle 202 may penetrate the bark 203, the phloem 204, the pith 205, and into the xylem 206 where the composition 100 may be injected.

The pith 205 is a tissue layer that provides partially undifferentiated cells for plant growth. It is found in the area between the two types of transport tissue in vascular plants, xylem 206 and phloem 204. Particles having sizes, larger than about 10 nm are often phloem-restricted, having limited accessibility to phloem tissue, although they can populate xylem vasculature easily after their root uptake. Various embodiments provide efficient, systemic delivery of cargos to plant vasculature system, in particular to phloem tissue. As used herein, the term "phloem tissue" or "phloem" has its usual meaning and refers generally to the living tissue in vascular plants that transports the soluble organic compounds made during photosynthesis. In trees, the phloem is the innermost layer of the bark. Particles having sizes larger than 10 nm often have limited accessibility to phloem tissue although they can populate xylem vasculature easily after their root uptake. As used herein, the term "size" as it relates to particles generally refers to an average diameter of a plurality of particles. For particles that are not perfectly spherical, the term "diameter" generally refers to the average of cross-sectional diameters in a plurality of directions such that the "diameter" is a reasonable approximation of the average dimensions of the particles. As such, all specific numerical values associated with particle size as used herein should be understood to be modified by the term "about." For example, a particle having a size larger than 10 nm may generally refer to a particle that would be likely to be captured by a filter having 10 nm gaps. Similarly, a plurality of particles having a size larger than 10 nm would indicate that on average the particles would be likely to be captured by a filter having 10 nm gaps.

Various embodiments provide a systemic cargo delivery system for plants that may also be applied with traditional application methods (foliar, soil-drench), no such cargo delivery system currently exists for treating plants. Various embodiments of the composition may also be useful in seed/fertilizer coatings.

Methods of Producing the Composition(s)

Various embodiments provided a straight-forward one-pot synthesis process that can be easily scaled-up. For example, a method of producing the compositions may include dispersing a salt of a metal micronutrient, such as zinc nitrate in a solution with a coating material, such as N-acetylcysteine. The coating material may form a complex by chelating the metal ions. The pH of the solution may then be raised to prompt formation of the cargo delivery particles comprising the metal micronutrient coated with the coating material. Subsequently the cargo may be added to the solution and may interact with the shells of the cargo delivery particles. Various embodiments of the production method are very cost-effective as agricultural-grade metal micronutrients like zinc and food-grade coating materials like N-acetylcysteine may be easily sourced as commodity products.

FIG. 3A is an example according to various embodiments illustrating a method 300 for producing cargo delivery particles according to various embodiments. The method 300 may include a step 302 of dispersing or dissolving a salt of a micronutrient in a solution. Step 302 may include agitating or stirring the solution. The micronutrient may be any micronutrient as described or implied herein, for example the micronutrient may be a metal micronutrient. For example, the salt may be a zinc nitrate, e.g. zinc nitrate hexahydrate, in which case the metal micronutrient would be zinc. The solution may comprise any suitable solvent, such as for example de-ionized (DI) water. After dispersal in the solution, ions of the micronutrient may be present in the solution. For example, zinc ions may be present in the solution. The method 300 may further include a step 304 of adding a coating material to the solution. The coating material may be any coating material as described or implied herein. The method 300 may further include a step 306 of allowing the coating material to interact the ions of the micronutrient. According to various embodiments, the interaction between the coating material and the ions of the micronutrient may be chelation. Chelation is a type of bonding of ions and molecules to metal ions. For example, the coating material may chelate a metal micronutrient. The method 300 may further include a step 308 of raising the pH of the solution. For example, the pH of the solution may be raised by the addition of a base, such as sodium hydroxide. The method 300 may further include a step 310 of allowing the formation of cargo delivery particles, such as the cargo delivery particles 101 illustrated in FIG. 1. The cargo delivery particles may have a core and a shell. The core may comprise the micronutrient and the shell may comprise the coating material. The method 300 may further include a step 312 of purifying the cargo delivery particles. Excess coating material and/or other impurities present in the solution may be removed by dialysis. Dialysis may be carried out for any suitable length of time, for example for a time in a range of from 12 to 72 hours. The solvent, such as DI water, may be changed or refreshed periodically throughout the dialysis period, such as at an interval of about every 8 hours. Finally, the method 300 may include a step 314 of drying the cargo delivery particles. The drying may be any type of drying, such as for example, freeze-drying the entire dialyzed solution. Upon drying, the cargo delivery particles may be obtained in the form of a powder.

Figure 3B:
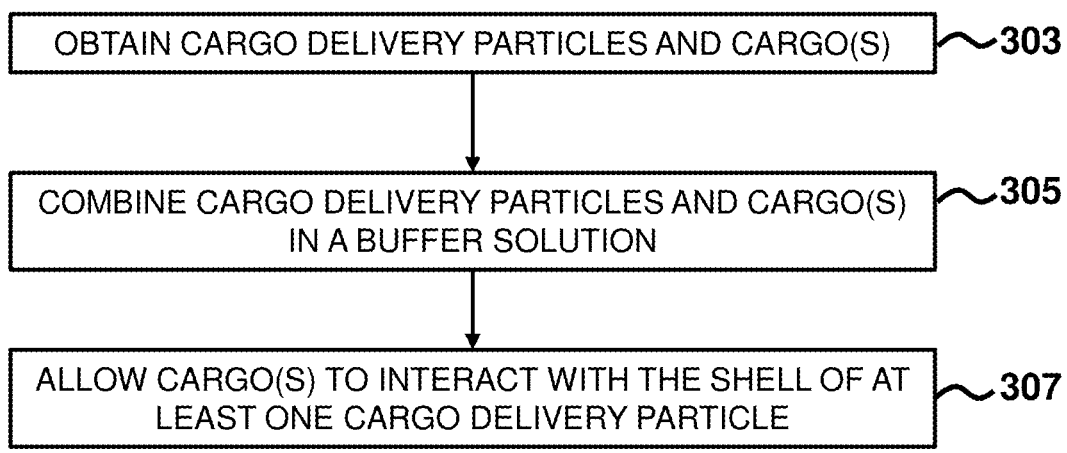

FIG. 3B is an example according to various embodiments illustrating a method 301 for producing compositions according to various embodiments. The method 301 may include a step 303 of obtaining cargo delivery particles and cargo(s). The cargo delivery particles may be obtained, for example, according to a method 300 as illustrated in FIG. 3A. The cargo(s) may be any of the cargos described or implied herein. The cargo(s) may be obtained from a commercial source or may be derived. The example provided hereinafter demonstrates a method of deriving Streptomycin as the cargo. The method 301 may further include a step of combining the cargo delivery particles and the cargo(s). The method 301 may further include a step 307 of allowing the one or more cargos to interact with the shell of at least one cargo delivery particle. The cargos may, of course, interact with a plurality of shells. The interaction may be any interaction between a cargo and a shell as described or implied herein.

EXAMPLES

Introduction

The following examples are put forth to provide those of ordinary skill in the art with a complete disclosure and description of how to perform the methods and how to make and to use the compositions and compounds disclosed and claimed herein. Efforts have been made to ensure accuracy with respect to numbers (e.g., amounts, temperature, etc.), but some errors and deviations should be accounted for. The purpose of this example is not to limit the scope of the various embodiments, but merely to provide an example illustrating specific embodiments of the composition, the method of making the composition, and the method of administering the composition.

Example 1

Materials and Methods
Materials

Manganese (II) acetate tetrahydrate was purchased from Acros Organics. Anhydrous sodium sulfide ($Na_2S$), N-acetylcysteine (NAC), zinc acetate dihydrate, streptomycin sulfate, and rezazurin sodium salt were purchased from Sigma-Aldrich. Ethanol (95%), hydrochloric acid (HCl), sodium hydroxide (NaOH), and Falcon® 96-well standard tissue culture (TC)-treated Culture Microplate were purchased from Fisher Scientific (Cat. #08-772-2C). Deionized water was obtained from a Barnstead purifier, model D11911. *Xanthomonas alfalfae* subsp. *citrumelonis* (*X. alfalfae*, ATCC 49120), *Escherichia coli* (*E. coli*, ATCC 35218), *Pseudomonas syringae* (*P. syringae*, ATCC 19310) were obtained from ATCC. All materials were used as received at room temperature and without further purification. All solvents used were reagent grade and used as received.

NAC-ZnNP Synthesis and Streptomycin Coating

Figure 4:
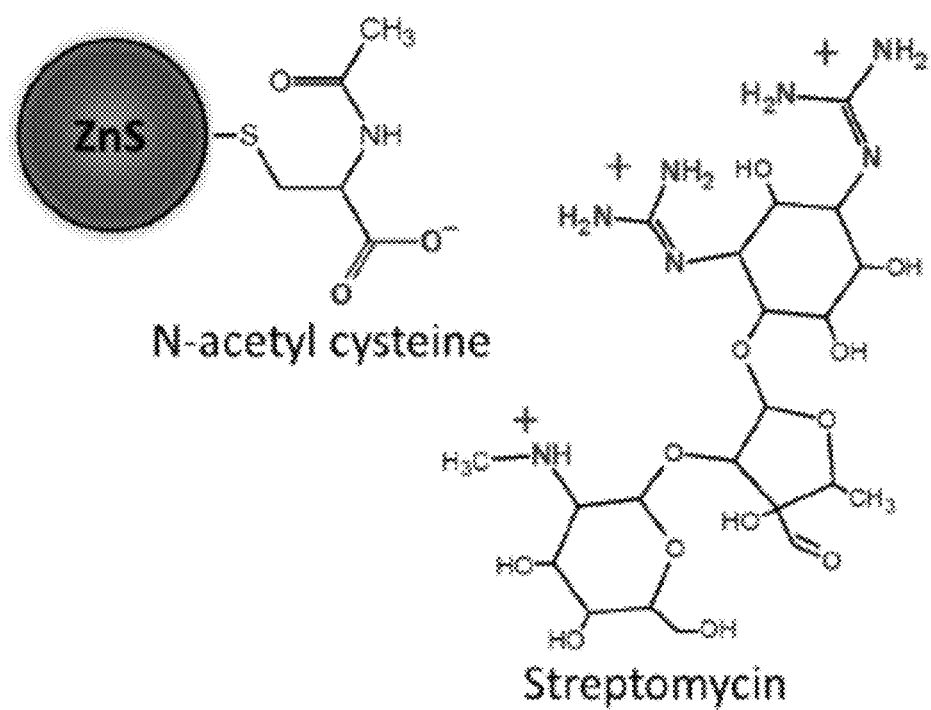

NAC-ZnNP were synthesized via a precipitation method. First a solution of 0.22 M $Zn^{2+}$ with 1% (mol) $Mn^{2+}$ was made in deionized (DI) water. A separate sulfide stock solution was prepared by dissolving $Na_2S$ in DI water to make a 0.66 M solution. A third stock solution of NAC was prepared in DI water with a NAC concentration of 0.26 M. Next, 540 µL of the NAC and 540 µL of the sulfide solution were mixed in a separate vial. This mixture was added dropwise to 720 µL zinc-manganese solution under magnetic stirring to produce NAC-ZnNP. The NAC-ZnNP solution was then filtered with a 0.22 µm syringe filter (Thermo Scientific Nalgene). The filtrate containing the NAC-ZnNP was centrifuged at 11,000 RCF (Relative Centrifugal Force) and subsequently washed with 95% ethanol (v/v) for five times. Each washing step involved brief vortexing of the solution followed by the centrifugation at 11,000 RCF for 5 minutes. The solution was then redispersed in DI water and lyophilized (FreeZone 4.5L Freeze Dry System, Labconco) to obtain NAC-ZnNP dry powder for further investigation. FIG. 4 is an example according to various embodiments illustrating a schematic diagram of a NAC-ZnNP-streptomycin conjugate (ZnNP-Strep). For producing NAC-ZnNP-streptomycin conjugate (ZnNP-Strep, FIG. 4), lyophilized NAC-ZnNP powder was redispersed in DI water followed by the addition of streptomycin sulfate solution. Streptomycin to NAC-ZnNP mass ratio was 1:3.

High Resolution Transmission Electron Microscopy (HR-TEM)

One drop of NAC-ZnNP solution in DI water was placed on carbon-coated gold TEM grid and allowed to air dry for 24 hours. The NPs were imaged using a FEI Tecnai F30 TEM operated at 300 kV. Images were processed with ImageJ software with particle size assessed from particles with clearly defined crystal lattices.

Fourier Transform Infrared Spectroscopy (FTIR)

NAC-ZnNP and ZnNP-Strep samples were washed five times with ethanol and lyophilized 48 h prior to FTIR measurement. The FTIR spectra were collected with a Perkin Elmer Spectrum 100 Series ATR FT-IR Spectrometer as an average of three scans with a resolution of 1 cm$^{-1}$.

Solution Spectroscopy

UV-visible spectroscopy was carried out using a Cary 300 UV-Vis Spectrophotometer. Fluorescence emission was collected using a NanoLog Fluorescence Spectrophotometer (SPEX, Jobin Yvon Horiba). Spectra were collected in DI water using 1 cm path length quartz cuvette.

Hydrodynamic Size and Zeta Potential

The hydrodynamic size was characterized by dynamic light scattering (DLS) and zeta potential measurements were carried out using electrophoretic light scattering on a Malvern ZetaSizer ZS90 (Malvern Instruments Inc. UK). Samples were analyzed by DLS in DI water with a 1 cm quartz cuvette. Zeta potential measurements were carried out in DI water using a clear disposable folded capillary zeta cell (Malvern Instruments Inc., UK). The pH of all samples was adjusted to 8.0 with either dilute NaOH or HCl. Samples were briefly sonicated prior to each measurement.

Streptomycin Loading and Release Studies

Figure 9:
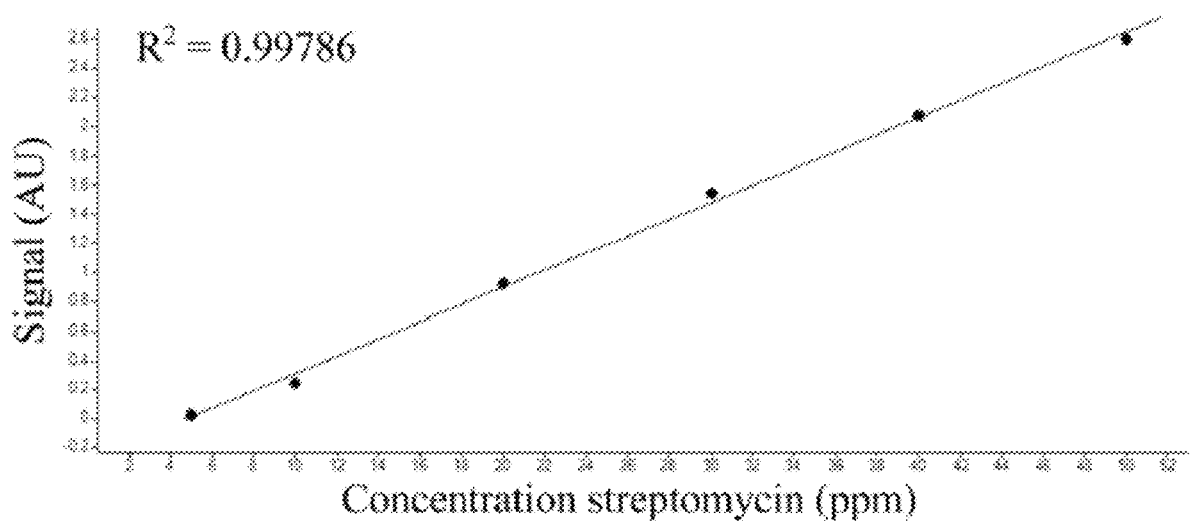

The loading of streptomycin on the NAC-ZnNPs was determined by filtering the as-synthesized unwashed ZnNP-Strep with a centrifuge filter (3 kDa cutoff Amicon ultra centrifugal filter unit) for 10 minutes at 11000 RCF. The unbound streptomycin that passed through the filter was diluted and quantified via LCMS using an Agilent 1260 Infinity Series LC with 6820 TOF MS equipped with an Agilent Zorbax C-18 column. Flow rate was 0.5 mL per minute isocratic flow of DI water with 0.5% formic acid for 3 minutes. The source was set to a gas temperature of 325° C. at 8 l/min flow rate and a nebulizer pressure of 35 psig. The fragmentor was set to 175° C. and acquisition scan set to 100-3000 m/z. A 6-point calibration curve was built with a linear range of 1 to 50 µg/mL streptomycin and analyzed with Agilent TOF Quantitative Analysis software (FIG. 9). Measurements were taken from an average of three simultaneous experiments. Percent loading of streptomycin was calculated as:

Loaded streptomycin (%)=Concentration streptomycin (initial)−Concentration streptomycin (filtrate)/Concentration streptomycin (initial)

Figure 10:
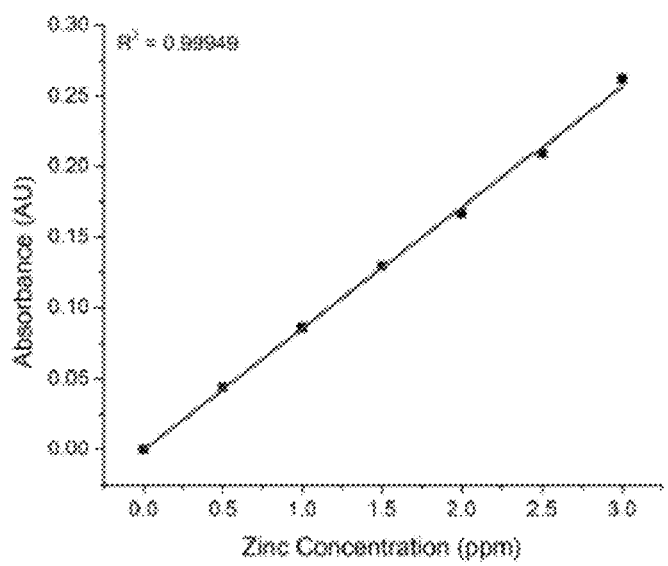

The ZnNP-Strep conjugate was washed multiple times by centrifuging in ethanol to remove any unbound streptomycin. The ZnNP-Strep samples were digested by diluting them with 1% HCl followed by sonication. The zinc content of the solutions analyzed by atomic absorption spectroscopy (AAS) with a Perkin Elmer Analyst flame AAS and compared to a 6-point zinc calibration curve built from zinc standard solution (Fluka) diluted in 1% HCl (FIG. 10). The molar mass of Zn per particle was then estimated by taking into account the number of Zn atoms present in a single unit cell of zinc blende crystal structure and calculating how many single unit cells per spherical particle with 3.5 nm average diameter (obtained from HRTEM). It is estimated that each 3.5 nm size ZnNP contains about 568 Zn atoms and therefore one mole of ZnNP is equivalent to 3.7×10$^4$ g of metallic Zn. The total mass of the zinc in the solution based on AAS study was then divided by the mass of zinc per mol of ZnNP to obtain the moles of particles. The streptomycin concentrations of the same solutions were analyzed via LCMS to determine how many moles of streptomycin were loaded per mole of ZnNP.

To determine the rate of release of streptomycin from the ZnNPs, equal volumes of ZnNP-Strep and streptomycin sulfate both at the same concentration of streptomycin were sealed in separate dialysis bags (3.5 kDa MW cutoff, SPECTRA/POR®) and dialyzed against equal volumes DI water in two separate containers. Without changing the water, samples were collected from the dialysate at specific timepoints. The samples were filtered with a 0.22 µm syringe filter and the streptomycin concentration was analyzed by LCMS using the method described previously.

Antimicrobial Assays

The antimicrobial efficacy of the ZnNP-Strep and controls were evaluated by the antimicrobial assay methods as previously described. Briefly, Microplate Alamar Blue Assay (MABA) was performed to initially screen the antimicrobial efficacy of the NPs. Then, the minimum inhibitory concentration (MIC) was determined by broth microdilution method in accordance with the guidelines of the Clinical and Laboratory Standards Institute (CLSI). As per the CLSI requirements, from a starter culture of 0.5 McFarland Standard, 5×10$^5$ CFU/well was added to all the wells. After 24 h of incubation with ZnNP-Strep and controls, the bacterial growth inhibition was ascertained using a spectrophotometer (570 and 600 nm). The accuracy of the MIC determination was improved by adding 10 µL of resazurin dye (0.0125%, w/v) per 100 µL well volume and observing color changes (from blue to pink for live organisms).

The antimicrobial efficacy of ZnNP-Strep was also studied after dialysis of the particles. The particles were dialyzed to remove any unbound streptomycin and simulate the effect of rainfall on the particles in field conditions. ZnNP-Strep was dialyzed against DI water with a 3.5 kDa MW cutoff dialysis membrane. The particles were dialyzed for 0, 1, 3, and 12 h and the remaining streptomycin loaded on the particles for each timepoint was quantified by LCMS by diluting the particles with 1% HCl and analyzing them with the previously described method. After streptomycin quantification the particles were diluted to 500 ppm streptomycin and their antimicrobial efficacy was assessed via MIC assay described above. The minimum bactericidal concentration (MBC) of the particles was also assessed by performing colony forming unit (CFU) plating. After 24 h incubation of bacteria with the samples, 100 µL of the treated bacteria was then transferred to nutrient agar plates. They were then spread dry using sterile spreaders (Fisher Scientific) and incubated for 48 h to check for bacterial growth at each concentration tested.

Phytotoxicity

The phytotoxicity of the ZnNP adjuvant with and without streptomycin was tested on tomato plants (*Solanum lycopersicum*, model fruit plant, 11 cm tall) obtained from Home Depot. The ZnNP treatments were applied directly on plant leaves (foliar application) using a hand-held sprayer until excess liquid starts dripping. Foliar application was conducted at 8:00 a.m. in a greenhouse setting to simulate field conditions. Treated plants were then placed in a growth chamber, Panasonic environmental test chamber (model MLR-352H) with summer settings (34° C., 60-80% RH). Phytotoxicity was evaluated 72 h post application. Digital photographs of treated leaves were taken for the visual assessment (phenotypic) plant tissue damage. Parallel treatments were done with copper sulfate at 1000 μg/mL (positive control) and DI water (untreated control, UTC) to compare phytotoxicity level with the ZnNP treatments. The appearance of brown necrotic spots, chlorosis, and necrosis on the leaves is indicative of plant tissue damage (i.e. phytotoxicity). Phytotoxicity was rated as follows: No toxicity (−), symptoms appear on less than 5% of the leaves was rated as minimal (+), 5 to 50% was rated as moderate (++), and above 50% was rated as severe (+++). Phytotoxicity studies were carried out in triplicate for each treatment and concentration.

Rainfastness Assay

Rainfastness of ZnNP-Strep and streptomycin was compared using leaves collected from 8-12-month-old citrus seedlings (Cleopatra; Citrus reshni). First, similar sized leaves were freshly cut from seedlings. The leaves were then copiously rinsed with DI water and patted dry. Next, 20 drops (2 μL per drop) of sample (streptomycin concentration of 500 μg/mL) was applied to each leaf and allowed to dry. To simulate rainfall, the leaves were slowly submerged 30 seconds into a glass beaker filled with DI water. The leaves were then placed on a paper towel and allowed to air dry for 1 hour. This process was then repeated to simulate a second rainfall. After each simulated rainfall, the remaining streptomycin on the leaf was removed and quantified using the following procedure. The leaves were placed in 5 mL polypropylene screw cap vials with 1 to 3 mL PBS (pH 7.4) and sonicated for 10 minutes using a bath sonicator. Vortex is intermittently used to ensure uniform mixing of the contents during sonication. The streptomycin removed from the leaves was filtered with a 0.22 μm syringe filter and quantified by LCMS analysis. Data was reported as a percentage of streptomycin removed from the leaf after washing compared to the total amount of streptomycin initially added.

Results and Discussion

Particle Size and Size Distribution

Figure 5A:
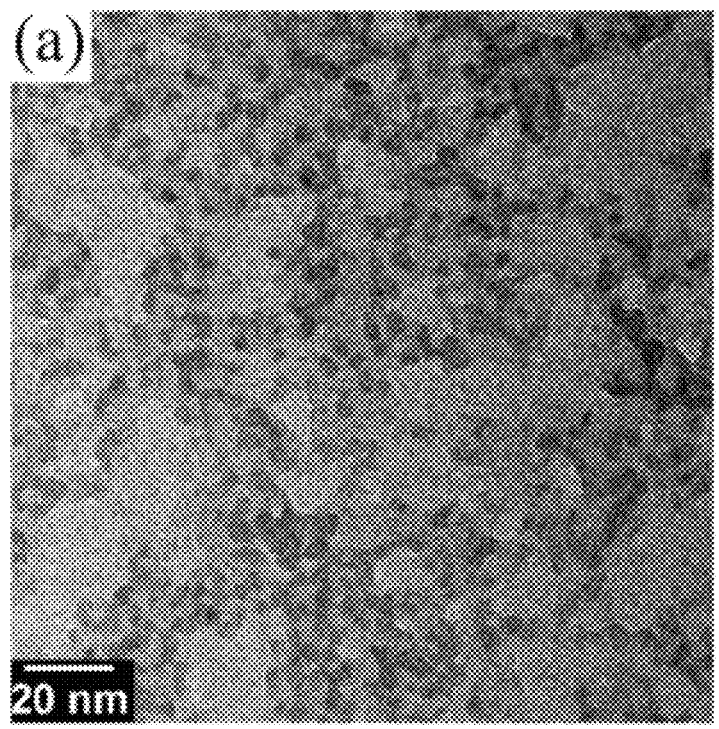
Figure 5B:
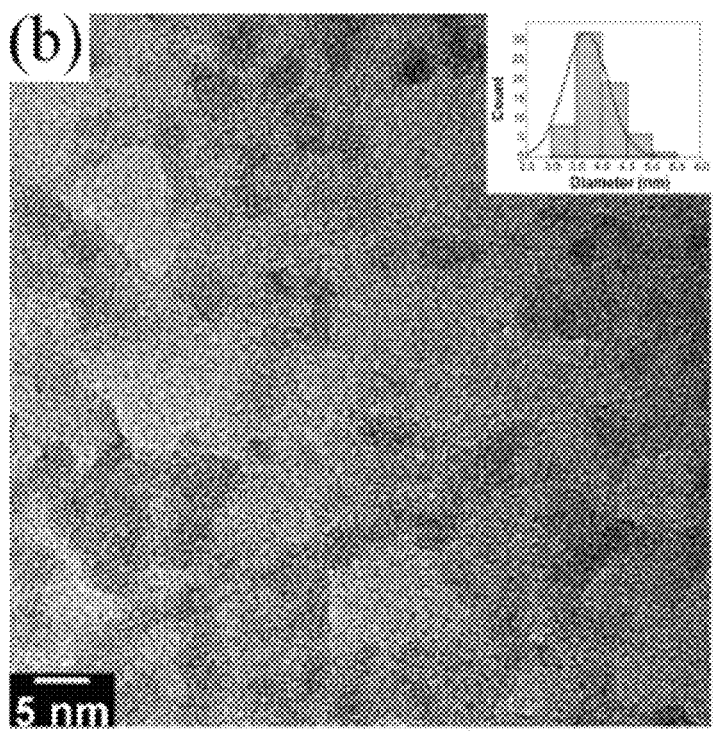
Figure 6A:
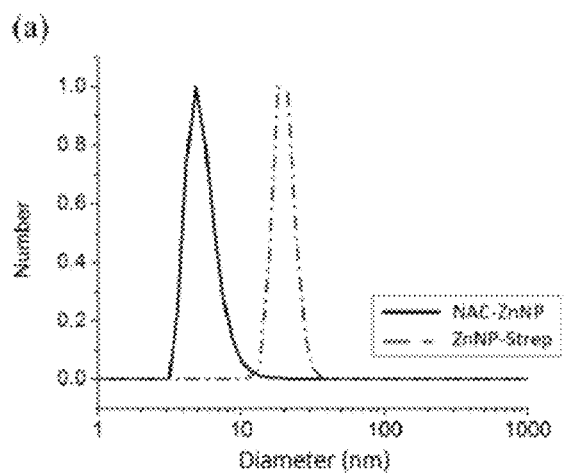
Figure 6B:
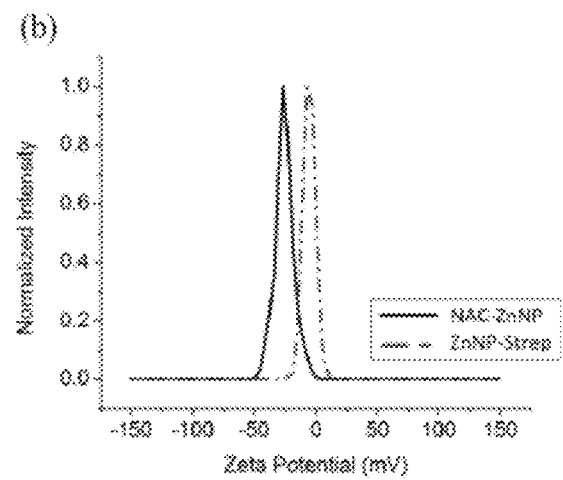
Figure 6C:
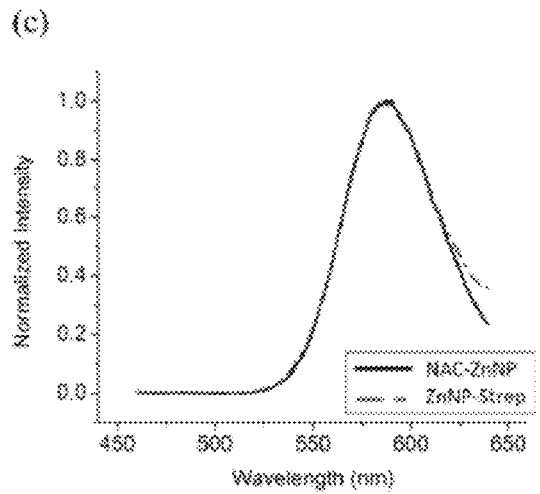
Figure 6D:
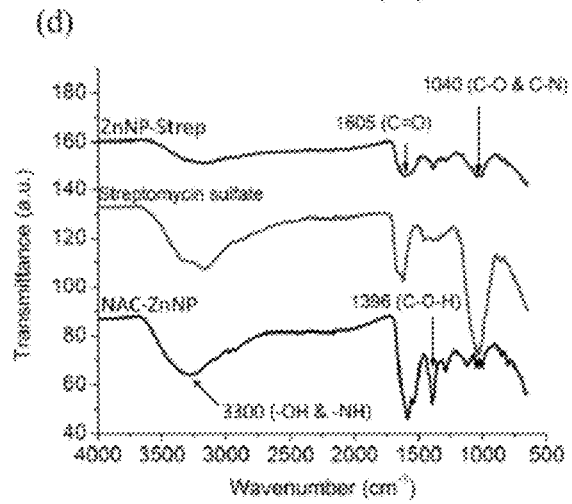

HRTEM analysis of NAC-ZnNPs showed the formation of monodisperse spherical particles with an average core diameter of 3.5 nm. FIG. 5A-B are examples according to various embodiments illustrating HRTEM images of NAC-ZnNP at different magnifications. The particles were coated with NAC that formed an organic anti-oxidant layer around the inorganic core. NAC was selected as a bi-functional capping agent because it contains a thiol (—SH) group and a carboxyl (—COOH) group in its molecular structure. Thiol functional groups have a high affinity to bind to the ZnS surface. Carboxyl groups of NAC are exposed outward, proving permanent negative charge to the NAC-ZnNP at neutral pH conditions. As a result, NAC-ZnNPs are charge-stabilized in aqueous solution via electrostatic interactions between negatively charged particles. NAC is an excellent surface capping agent that is also responsible for controlling the growth process leading to the formation of ultra-small size (<5 nm) particles.

Figure 7:
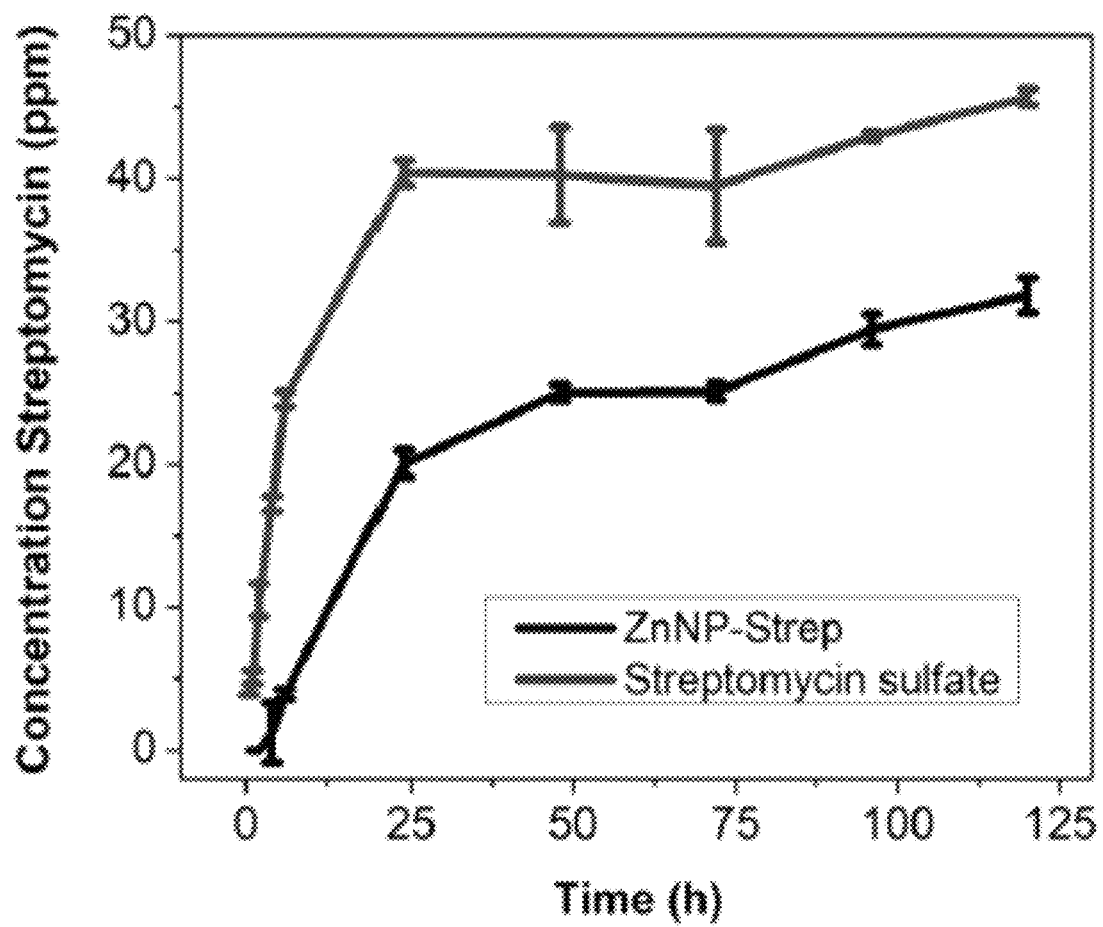

Next the possibility of creating a conjugate between the NAC and streptomycin to reduce its release rate in water and improve rainfastness was investigated. There are two ways one can immobilize streptomycin onto NAC-ZnNPs, electrostatic interactions and covalent coupling. The latter method will require additional coupling chemistry to conjugate carboxyl group of the NAC-ZnNPs with the anime groups of streptomycin. Another disadvantage of this method is that it forms a stable amide bond between streptomycin and NAC molecules, limiting availability of streptomycin it its original form. Streptomycin sulfate in water produces positively charged streptomycin cation where amine groups are protonated (FIG. 4). Therefore, cationic streptomycin molecule can be immobilized over the negatively charged NAC-ZnNPs via electrostatic attraction once they are combined together in solution.

Several characterization techniques were used to determine solubility, surface charge, optical properties, and colloidal stability of the ZnNP-Strep. FIG. 6A is an example according to various embodiments illustrating the hydrodynamic diameter of Nac-ZnNP and ZnNP-Strep. FIG. 6B is an example according to various embodiments illustrating the Zeta potential of NAC-ZnNP and ZnNP-Strep at pH 8. The DLS hydrodynamic diameter was found to be 8 nm for NAC-ZnNP and 20 nm for ZnNP-Strep (FIG. 6A) with a zeta potential of −37 mV and −5 mV respectively (FIG. 6B). The hydrodynamic diameter was larger for ZnNP-Strep due to the neutralization of the negative surface charge by streptomycin which reduces electrostatic repulsion between the particles. The 20 nm average size is due to particle aggregation in solution. It has been shown that stomata have pore sizes ranging from 3.5 nm to 20 nm and NPs of 5.4 nm or less in diameter are able to move between the cell walls in citrus plants. Due to small size, it could be reasonable to expect that some ZnNP-Strep conjugate would mobilize to inner layer of the plant leaf surface through stomata, thus contributing to improved rainfastness.

Fluorescence emission maxima of NAC-ZnNP and ZnNP-Strep were observed at 590 nm under UV excitation (320 nm) due to the presence of $Mn^{2+}$ dopant. FIG. 6C is an example according to various embodiments illustrating the fluorescence emission of NAC-ZnNP and ZnNP-Strep at 320 nm excitation. It was observed that the fluorescence property of the NP core (ZnS:Mn) did not compromise due to NAC or NAC-streptomycin coating. FIG. 6D is an example according to various embodiments illustrating FTIR spectra of NAC-ZnNP, streptomycin sulfate, and ZnNP-Strep. Absorption at 1605 $cm^{-1}$ is characteristic of C═O stretching of the amide I band in NAC. The sharp absorption band at 1396 $cm^{-1}$ in NAC-ZnNP and ZnNP-Strep is indicative of O—H bending of the carboxyl group in NAC. Strong C—O (alcohol) and C—N(amine) stretching bands appear around 1040 $cm^{-1}$ in streptomycin sulfate and ZnNP-Strep but are absent in NAC-ZnNP. This suggests successful immobilization of streptomycin onto the NAC-ZnNP surface.

The loading of streptomycin on the particles was assessed by separating the ZnNP-Strep conjugates from unbound streptomycin by centrifugal filtration and it was found that 77.2% of the streptomycin was loaded on the particles. For agricultural field applications it may be beneficial that not all the streptomycin is loaded to the particle as the initial unbound streptomycin can be used for contact killing and the loaded streptomycin would be slowly released to provide a barrier against incoming bacteria. LCMS analysis showed that 1 mole of NAC-ZnNP could associate with a maximum of 26±5 mole of streptomycin.

Antimicrobial Studies

The antibacterial efficacy of ZnNP-Strep was tested against *E. coli, P. syringae* and *X. alfalfae* and compared to streptomycin sulfate, NAC, and NAC-ZnNP (Table 5). *X. alfalfae* was chosen as it is a surrogate for citrus canker causing pathogen *Xanthomonas citri* subsp. *citri*. It was found that the NAC-ZnNP and NAC by themselves had no growth inhibitory effect even at the highest concentration tested, i.e. 1000 μg/mL. This is due to the low solubility of ZnS which limits antimicrobial Zn ion release from the particles. The antimicrobial activity of ZnNP-Strep was compared to streptomycin sulfate. The purpose was to check if there is any loss of efficacy of streptomycin when it is associated with the ZnNP. Our results showed fairly comparable bactericidal activity of ZnNP-Strep with the streptomycin alone in inhibiting growth of *P. syringae, X. alfalfa*, and *E. coli* (Table 1). To test the rate of release of streptomycin from the ZnNP-Strep, the material was dialyzed against water to simulate the conditions of rainfall on treated leaves. FIG. 7 is an example according to various embodiments illustrating the amount of streptomycin (ppm) released with respect to time. FIG. 7 shows that the ZnNP-Strep had a much slower rate of release of streptomycin than the streptomycin alone. This suggests that the ZnNP-Strep should provide longer period of protection against infection due to rainfastness improvement.

TABLE 5

| Material tested | X. alfalfae (MIC) | P. syringae (MIC) | E. coli (MIC) |
| --- | --- | --- | --- |
| Streptomycin | 2 μg/mL | 2 μg/mL | 6 μg/mL |
| ZnNP-Strep | 4 μg/mL | 2 μg/mL | 6 μg/mL |
| NAC-ZnNP | No inhibition | No inhibition | No inhibition |
| NAC Only | No inhibition | No inhibition | No inhibition |

Table 5 shows MIC (concentration active) of streptomycin sulfate, ZnNP-Strep, NAC-ZnNP, and NAC only on *X. alfalfae*, *P. syringae*, and *E. coli*.

Phytotoxicity Assay

Figure 11:
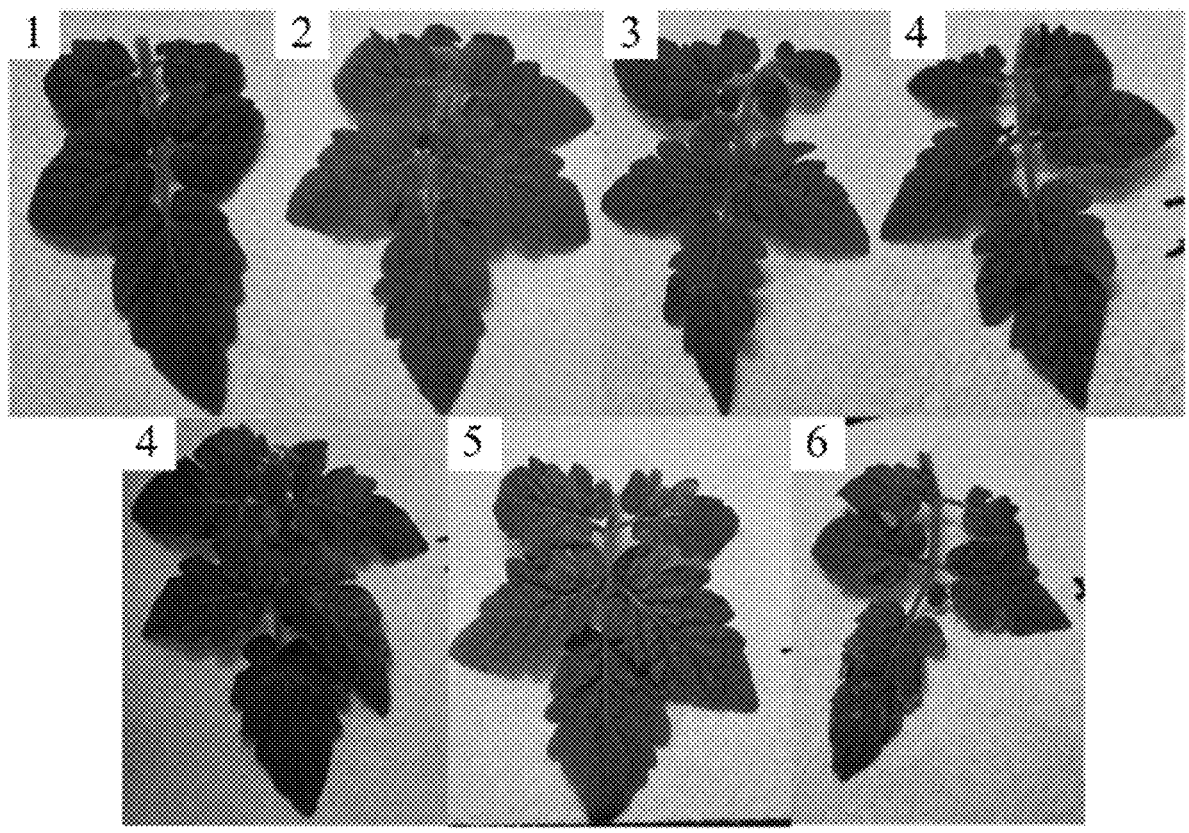

The phytotoxicity of ZnNP-Strep was tested at different concentrations and the results were compared with controls, streptomycin, NAC-ZnNP and copper sulfate using tomato plants. Tomato plants were selected for this study as they are more susceptible to phytotoxicity than citrus plant due to lack the proactive waxy coating on the leaves. Table 6 compiles the phytotoxicity data after 72 hrs of foliar application. No signs of phytotoxicity was observed for any treatments and controls except Cu sulfate at 1000 μg/mL metallic Cu (positive control). As expected, tomato plants exhibited many brown spots due to the free copper ion phytotoxicity. FIG. 11 is an example according to various embodiments illustrating images of tomato leaves 72 hours after treatment in phytotoxicity experiments.

FIG. 12A is an example according to various embodiments illustrating an image of tomato leaves 72 hours after treatment with ZnNP-Strep (500 ppm) in phytotoxicity experiments illuminated with a handheld UV light at 367 nm. FIG. 12B is an example according to various embodiments illustrating an image of tomato leaves 72 hours after treatment with ZnNP-Strep (500 ppm) in phytotoxicity experiments illuminated with a handheld UV light at 254 nm. FIG. 12 shows a digital photograph of tomato leaves after 72 h of foliar application of the ZnNP-Strep, showing bright yellow-emitting fluorescence when illuminated with a handheld multi-band UV lamp (UVP 95-0007-06, 254 nm) This fluorescence signal could be used as an indicator for tracing the presence of the treatment on the plant. This optical based tool could be helpful to farmers in determining the antibiotic application frequency and could potentially reduce the overuse of antibiotics.

TABLE 6

| Material tested | Concentration of active ingredient (Streptomycin, metallic Cu, metallic Zn) | Tomato sp. a |
| --- | --- | --- |
| Untreated control (water) | N/A | − |
| Streptomycin sulfate | 1000 μg/mL Strep | − |
| NAC-ZnNP | 250 μg/mL Zn | − |
| NAC-ZnNP | 500 μg/mL Zn | − |
| ZnNP-Strep | 500 μg/mL Strep | − |
| ZnNP-Strep | 1000 μg/mL Strep | − |
| Copper sulfate | 1000 μg/mL Cu | +++ |

Table 6 shows Phytotoxicity of Streptomycin, NAC-ZnNP, ZnNP-Strep, and copper sulfate on tomato. In Table 6, the following abbreviations are used: a+++, severe toxicity; ++, moderate toxicity; +, low toxicity; −, zero toxicity.

Rainfastness Assay

Figure 8:
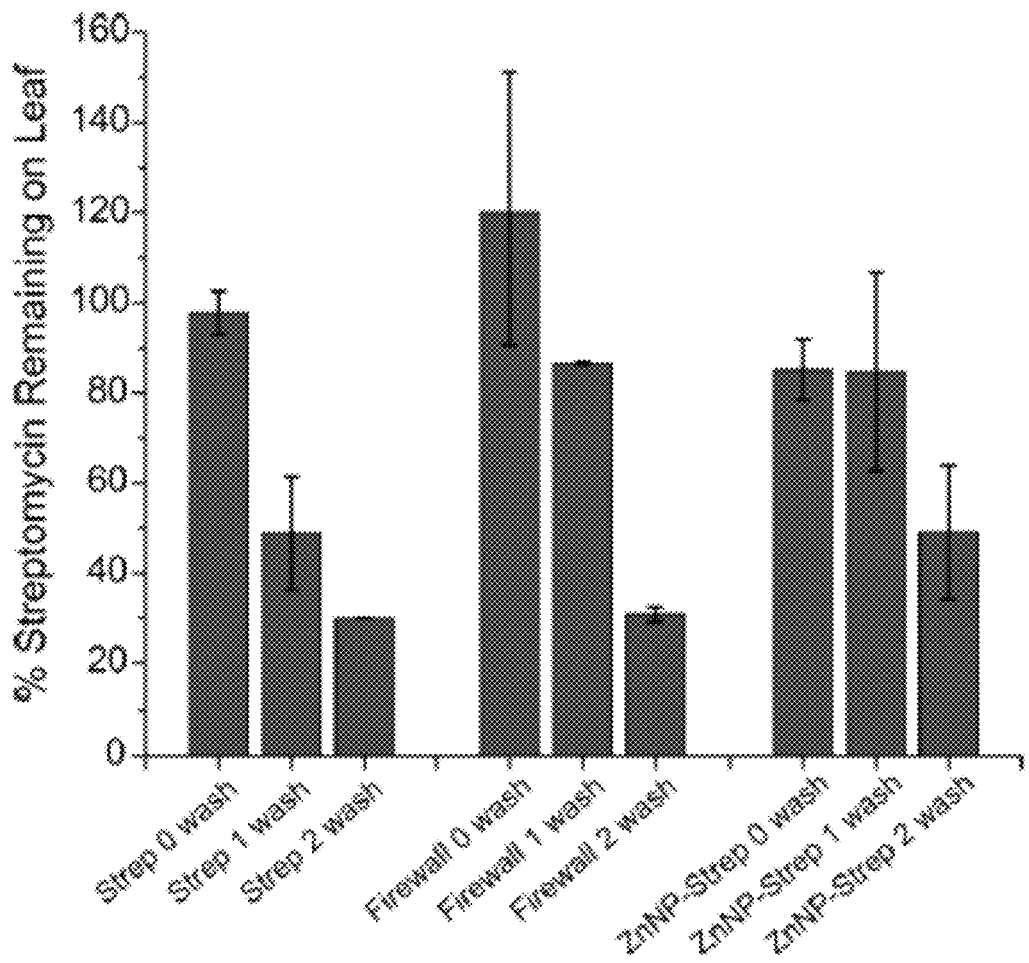

Rainfastness experiments were conducted to determine if the ZnNPs improve the retention of streptomycin on citrus leaves. The extraction efficiency of streptomycin from the leaf surface was assessed by adding and then removing streptomycin from unwashed leaves. The amount of streptomycin removed from the leaf was compared to the amount of streptomycin applied to the leaf to determine the extraction efficiency. This was done to ensure what percentage of streptomycin was being removed from the leaf surface. The extraction efficiency for streptomycin sulfate was 98% and for ZnNP-Strep was 85% due to some streptomycin retained on the NAC-ZnNP after sample preparation. The extraction efficiency for FireWall™ 50 WP (a commercial product containing streptomycin sulfate as the active ingredient) was greater than 100% which can be attributed to the inhomogeneous and insoluble nature of the raw material. After the materials were dried the leaves were submerged in water to simulate the effects of heavy rainfall and remaining streptomycin on the leaves removed and quantified by LCMS. Around 50% of the streptomycin sulfate was removed after the first wash with only 30% remaining after the second wash. FIG. 8 is an example according to various embodiments illustrating rainfastness of streptomycin sulfate (Strep), FIREWALL™ 50 WP, and ZnNP-Strep on citrus leaves. FireWall™ 50 WP performed better than pure streptomycin with only 30% loss after the first wash and 30% remaining after the second wash. The loss of streptomycin from ZnNP-Strep was much reduced with 5% loss of streptomycin initially and 35% loss after the second wash.

An investigation was conducted to determine whether ZnNP-Strep would retain antimicrobial efficacy after rainfall. To simulate this, MIC testing was carried out on ZnNP-Strep using dialysis technique that simulates removal of treatment due to rainfall. Table 7 shows the antibacterial efficacy of the ZnNP-Strep particles with respect to streptomycin concentration after dialysis from 1 to 12 h. It was found that the antimicrobial efficacy was not compromised with the dialysis time. Our rainfastness study shows that streptomycin content is reduced with the increase of dialysis time. FIG. 7 is an example according to various embodiments illustrating the amount of streptomycin (ppm) released with respect to time.

This suggests that antimicrobial potency of streptomycin might have increased in association with ZnNP.

TABLE 7

| Material tested | Dialysis time | X. alfalfae (MIC) a | X. alfalfae (MBC) a |
| --- | --- | --- | --- |
| Streptomycin | N/A | 1 μg/mL | 16 μg/mL |
| ZnNP-Strep | 0 h | 1 μg/mL | 4 μg/mL |
| ZnNP-Strep | 1 h | 1 μg/mL | 4 μg/mL |
| ZnNP-Strep | 6 h | 1 μg/mL | 4 μg/mL |
| ZnNP-Strep | 12 h | 1 μg/mL | 4 μg/mL |

Table 7 shows Antibacterial efficacy of ZnNP-Strep after dialysis on *X. alfalfae*. In Table 7, MIC and MBC were determined relative to concentration of streptomycin in the sample.

CONCLUSIONS

In summary, various embodiments provide a ZnNP based adjuvant for improving streptomycin rainfastness. The ZnNPs were synthesized via a one-step one-pot precipitation reaction and coated with streptomycin. The ZnNP-Strep was shown to retain more streptomycin on the leaf surface after simulated rainfall than the commercially formulated streptomycin. This particulate adjuvant was shown to allow controlled the release of streptomycin, needed for long-lasting antimicrobial protection and therefore disease control. Based on the MIC study of the dialyzed ZnNP-Strep samples, it appears that the antimicrobial potency of streptomycin might have been increased when it is associated with ZnNP.

What is claimed is:

1. A composition for systemic delivery of at least one cargo in a vascular plant, the composition comprising:
    at least one cargo delivery particle,
        wherein the at least one cargo delivery particle comprises a core and a shell; the at least one cargo delivery particle having a size of less than about 10 nanometers,
        the core comprising at least one nanostructure, the nanostructure comprising ZnS doped with Manganese, wherein the core comprises about 1 to about 5%, by weight, zinc; and wherein the cargo delivery particle is produced by mixing a zinc-manganese solution with a NAC-sulfide solution, and wherein a ratio of Zn to NAC in the composition is from about 1:1 to about 1:0.25,
        wherein the shell comprises a coating material; wherein the coating material comprises N-acetylcysteine (NAC);
        wherein the core further comprises at least one additional metal micronutrient wherein the additional metal micronutrient comprises iron, and
    at least one cargo disposed on the shell of the cargo delivery particle, wherein the at least one cargo comprises a positively charged agricultural antibiotic, and wherein the at least one cargo delivery particle is free of cadmium and lead.

2. The composition according to claim 1, wherein the coating material is hydrophilic.

3. The composition according to claim 1, wherein the positively-charged agricultural antibiotic is streptomycin.

4. An antimicrobial treatment composition for suppressing or preventing a plant pathogenic bacteria, the antimicrobial treatment composition comprising:
    at least one particle,
        wherein the at least one particle comprises a core and a shell; the at least one particle having a size of less than about 10 nanometers;
        wherein the core comprises at least one nanostructure comprising ZnS doped with Manganese;
        wherein the core comprises about 1 to about 5%, by weight, zinc;
        wherein the shell comprises N-Acetylcysteine (NAC); and
        wherein the at least one particle is produced by mixing a zinc-manganese solution with a NAC-sulfide solution such that a ratio of Zn to NAC in the antimicrobial treatment composition is from about 1:1 to about 1:0.25;
        wherein the core further comprises at least one additional metal micronutrient wherein the additional metal micronutrient comprises iron, and
    at least one agricultural antibiotic disposed on the shell.

5. The antimicrobial treatment composition according to claim 4, wherein the plant pathogenic bacteria comprises *X. alfalfae* and *P. syringae*, or a combination thereof.

6. A method for suppressing or preventing a plant pathogenic bacteria in a plant comprising administering an effective amount of the antimicrobial treatment composition according to claim 4 to a plant.

7. The method according to claim 6, wherein administering the effective amount of the antimicrobial treatment composition comprises one selected from the group consisting of injecting the composition into the plant, spraying the composition onto the plant, and combinations thereof.

* * * * *